Inventors:
William V. Goodhue
and Robert E. Morton
By Watson, Cole, Grindle & Watson
Attorneys.

Inventors:
William V. Goodhue
and Robert E. Morton
By Watson, Cole, Grindle + Watson
Attorneys.

Patented May 19, 1953

2,638,937

UNITED STATES PATENT OFFICE 2,638,937

BOBBIN STRIPPER

William V. Goodhue and Robert E. Morton, Warwick, R. I., assignors to Universal Winding Company, Boston, Mass., a corporation of Massachusetts Application August 25, 1949, Serial No. 112,362

32 Claims. (Cl. 139—262)

This invention relates to a bobbin-stripper for removing the residue of yarn remaining in the bunch or reserve winding on the bobbin after the service winding has been exhausted in the shuttle of a loom.

One object of the invention is to provide an automatically-operated bobbin-stripper for receiving spent bobbins discharged from the shuttle of a loom, removing the yarn remaining thereon after the exhaustion of the service winding and delivering the stripped or denuded bobbins to a conveyor for transporting them to a winding machine to again fill the bobbins with weft or filling yarn.

Another object is to provide a device of the character specified which may be applied to use in cooperation with an automatic loom for receiving the bobbins as they are ejected from the shuttle by the filling-changing mechanism and removing the residual yarn therefrom.

Another object is to provide a device of the character specified for catching the bobbins as they are ejected from the shuttle, retaining the length of yarn trailing from each bobbin and unwinding it therefrom while discharging it into a receiving compartment or container for the waste.

Another object is to provide a device of the character specified in which the bobbin ejected from the shuttle is caught and held in upright position, the remaining yarn on the bobbin unwound therefrom, and the stripped bobbin transferred to a conveyor, with the several operations accomplished automatically in recurring cycles.

Another object is to provide a device of the character specified adapted to operate in synchrony with the operation of the filling-changing mechanism in automatic looms of various types.

Another object is to provide a device of the character specified including a bobbin-conveyor having magnetic means for picking up the bobbins from the stripper as they are delivered therefrom after the stripping is completed to transfer the empty bobbins to a winding machine or other apparatus.

Another object of the invention is to provide a bobbin-stripper of simple construction and compact design adapted to be attached to the frame of a loom and actuated by the power means thereof.

Further objects of the invention are set forth in the following specification which describes a preferred form of construction of the bobbin-stripper as illustrated by the accompanying drawings showing it applied to use in connection with the filling-changing mechanism of two different types of looms. In the drawings.

In automatic looms in general use at the present time the filling or weft yarn is supplied from bobbins carried by thrown shuttles and upon substantial exhaustion of the yarn on each bobbin, filling-changing mechanism operates automatically to eject the spent bobbin and substitute a full bobbin so that the loom continues to weave without interruption with the filling supplied by reserve bobbins transferred from a rotary battery or vertical magazine. The transfer-mechanism of the loom operates to force a new bobbin down into the shuttle as the latter is boxed at the end of the lay, thereby driving out the spent bobbin which is ejected down through an opening in the bottom of the shuttle thence to be caught in a receptacle placed therebelow. For use in automatic looms the bobbins are wound with an initial length of reserve yarn, termed a "bunch," to insure against the yarn running out before the bobbin is changed in the shuttle which otherwise would cause "mispicks" in the cloth being woven. Feeler motions are provided for testing the yarn in the shuttle at each pick and when the service winding on the bobbin is exhausted, or substantially so, the feeler engages with the bobbin to initiate the operation of the filling-changing or transfer mechanism to supply a fresh bobbin to the shuttle as it is boxed at the end of the lay.

It is obvious that when the spent bobbins are ejected from the shuttle carrying a residue of yarn remaining in the bunch they cannot be used for rewinding since the yarn must be continuous from the bunch to the service winding in order for the filling change to be made without a break in the filling as it is woven. Heretofore, it has been a common practice to remove the bobbins from the loom and convey them to another location where, by means of a bobbin-stripper, the bunch-winding may be unwound or otherwise denuded from the bobbin to prepare it for rewinding. In some cases the bunch is stripped by cutting through the coils of yarn with a knife or other sharp instrument, but this practice is objectionable as the knife is liable to slit the barrel of the bobbin and mutilate it so that the yarn will not deliver freely therefrom. Various types of bobbin-strippers have been devised for removing bunch-windings from bobbins, but in most cases they require manual operation and have not always been found satisfactory in practice. It is therefore an important object of the present invention to provide a bobbin-stripper that is entirely automatic in its operation and can be applied directly to the loom to be driven thereby and to operate in synchrony with the filling-changing mechanism thereof to continuously take the bobbins as they are ejected from the loom-shuttle, strip the residual yarn therefrom, and transport the denuded bobbins to the winding machine where they can be supplied again with new bunch-winding continuous with the service winding. The present invention provides such an improved type of bobbin-stripper as described in the following specification.

Figure 1:
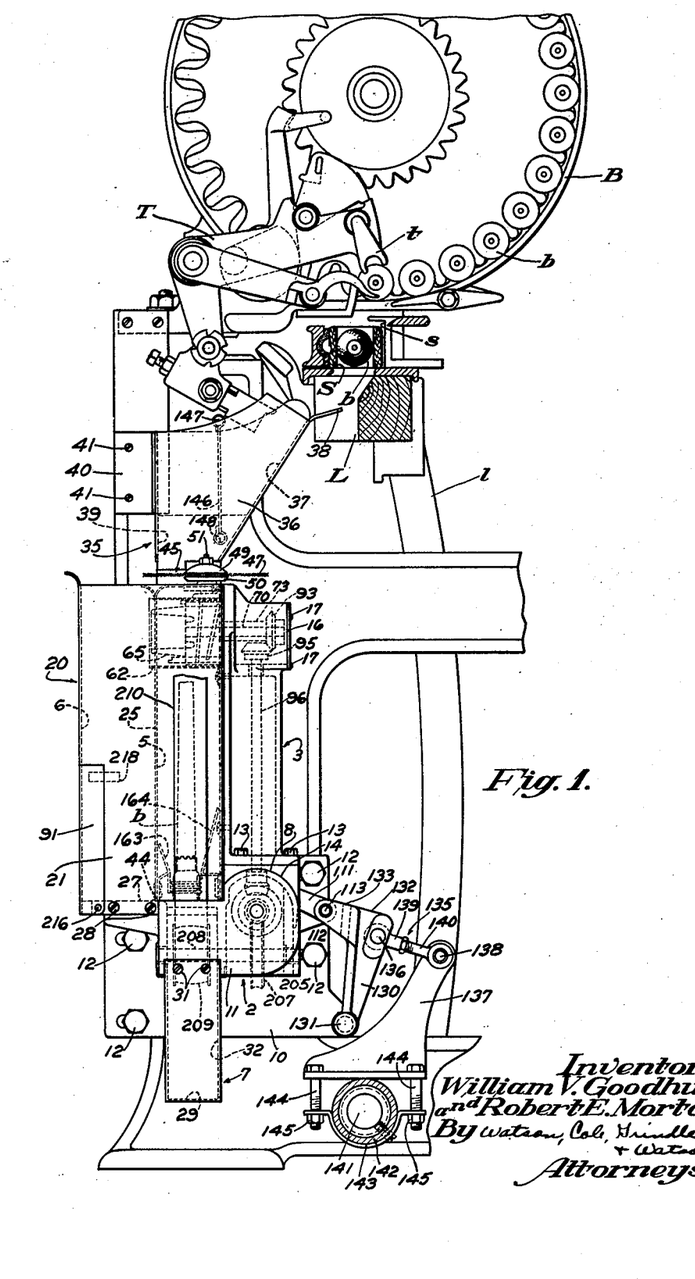
Fig. 1 is a side elevational view of the complete bobbin-stripper shown as applied to the side of a loom embodying filling-changing mechanism employing a rotary battery for reserve bobbins.

Referring to Fig. 1 of the drawings, the present improved bobbin-stripper is therein shown as operatively associated with a loom having the usual oscillating lay L carried by rocker arms or "swords" l, shuttle S received in the shuttle-box s. The wound reserve bobbins b are shown as supplied from a rotary battery B of well-known type and the filling-changing mechanism comprises essentially a transferer T having means t for engaging each bobbin as it is indexed to a position above the shuttle to force it down thereinto and thereby eject the spent bobbin therefrom which drops through the opening in the lay.

Figure 3:
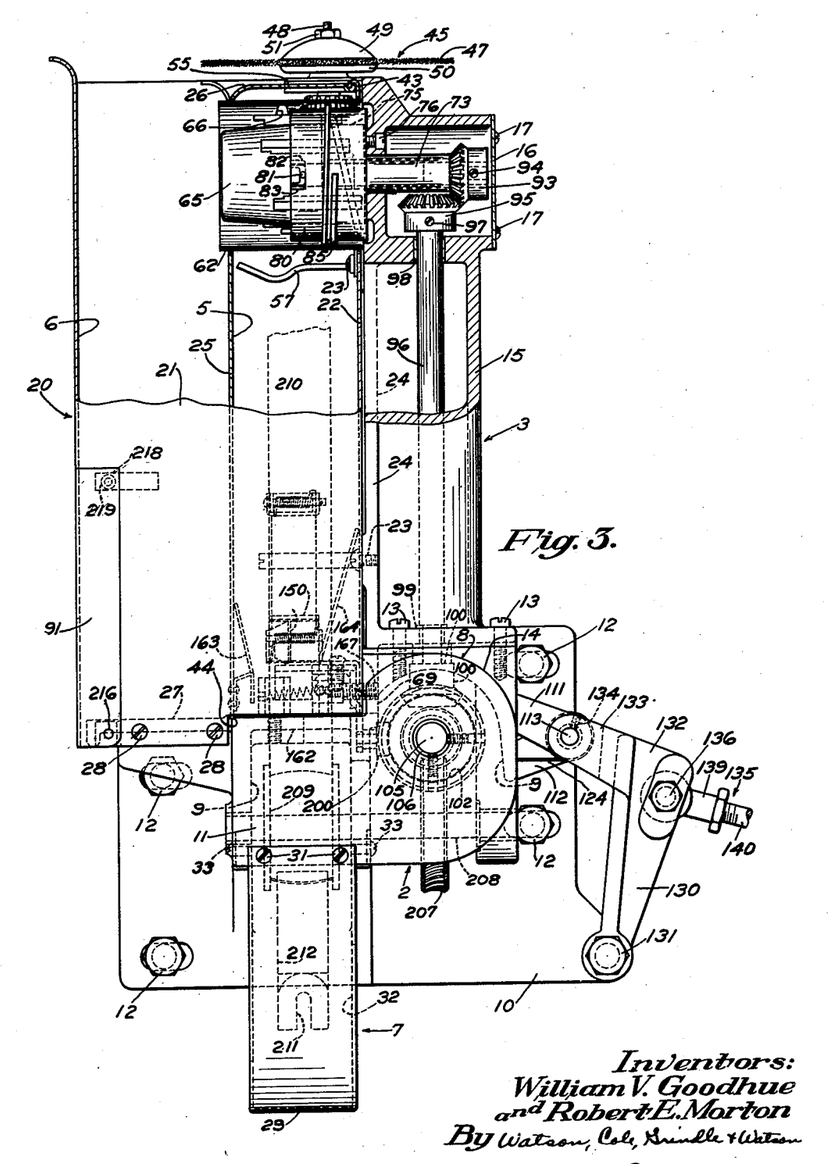
Fig. 3 is an enlarged side elevational view of the complete bobbin-stripper showing the walls of its casing as partly broken away at the top to illustrate the conical drum or mandrel on which the yarn from the bobbin is wound during the stripping process and illustrating the driving means therefor.
Figure 6:
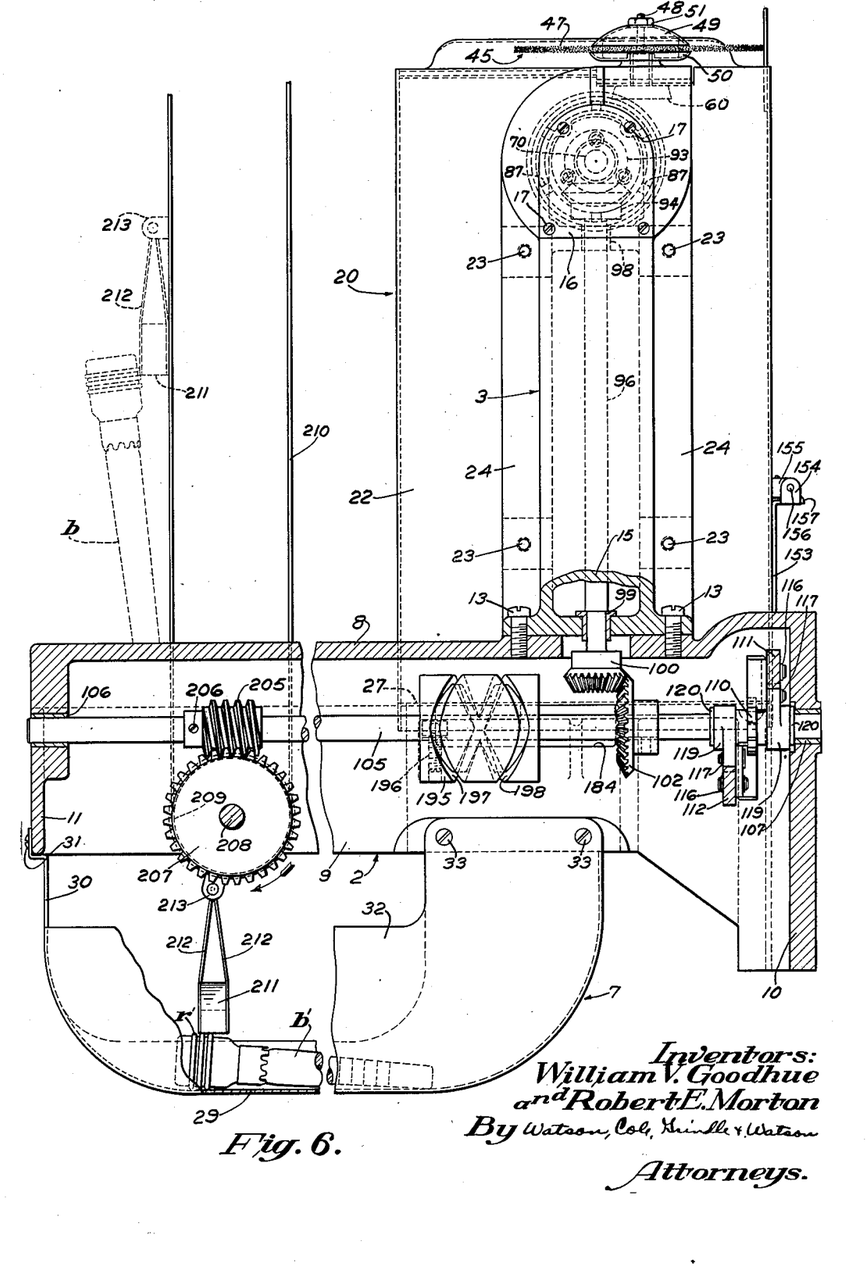
Fig. 6 is a rear view of the device shown with the lower housing in vertical section to illustrate the main drive-shaft and the driving connections for the cam which reciprocates the bobbin-ejector slide and also illustrating the drive for the conveyor-belt carrying the magnet for lifting the bobbins out of the bottom pocket or receptor, which latter is shown as having its side wall partly broken away.

Referring to Figs. 3 and 6, the present bobbin-stripper is constructed with its operating mechanism enclosed within a multi-part casing comprising, in general, a lower housing 2, a shaft-and gear-housing 3, a main compartment 5 for holding the bobbin to be stripped, and an outer or forward compartment 6 into which the removed yarn is discharged as waste. Below the bottom housing 2 is a pocket-like compartment or receptor 7 for receiving the denuded bobbins prior to transporting them to another location.

The lower housing 2, see Figs. 3 and 6, may be constructed as a casting comprising a top wall 8, side walls 9, a rearward end wall 10, and a forward end wall 11 with its bottom left open. The vertical end wall 10 forms the means for attaching the complete casing to the side of the loom, an adaptor-bracket (not herein shown) being clamped to the leg of the loom with the end wall 10 of the housing 2 fastened thereto by bolts 12 shown in Fig. 1. The adaptor-bracket may be of such construction as to adapt it to be clamped to the frames of different types of looms, but since it is not an essential part of the present invention it is not herein shown or described in detail. The housing 2 forms the support for the remaining parts of the casing of the stripper, the housing 3, being mounted on a flat seat on its upper wall 8 as shown in Fig. 6 and secured thereto by bolts 13. Substantially one-half of the top wall 8 of the housing 2 is arched or domed at 14 as shown at the right in Fig. 3, while its remaining lateral portion is flat.

Figure 5:
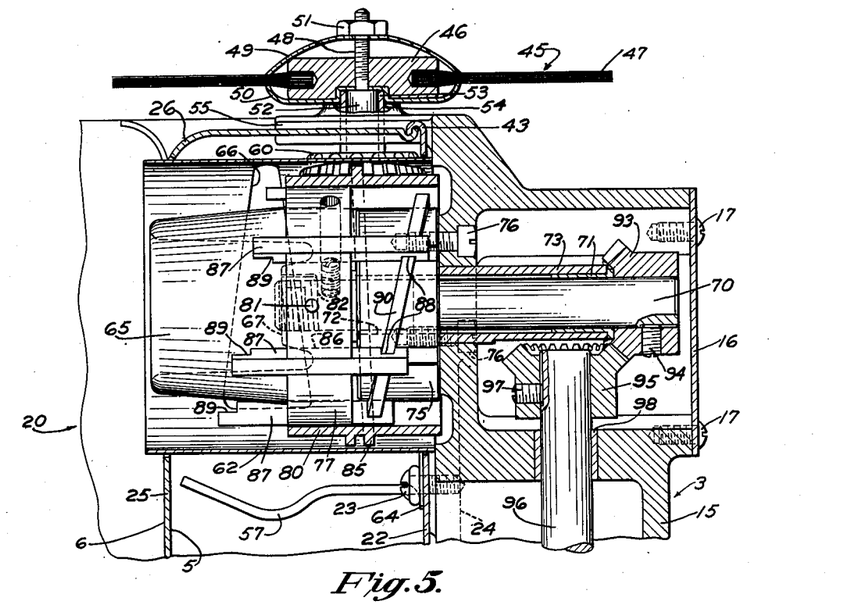
Fig. 5 is a still further enlarged view of the winding-on cone or mandrel which withdraws the yarn from the bobbins, showing the reciprocating fingers for pushing the coils of yarn off from the cone; the casing of the device being shown in vertical sectional view to disclose the driving mechanism for the cone and the cam which reciprocates the fingers.

The housing 3 may also be constructed as a casting having a semi-cylindrical portion 15 extending upwardly from its base and terminating in an arched top for enclosing certain of the gears of the driving mechanism of the stripper, a cover-plate 16 being attached to its rearward open end by screws 17 to provide for its removal for inspection of the gearing, see Figs. 3, 5 and 6.

Figure 9:
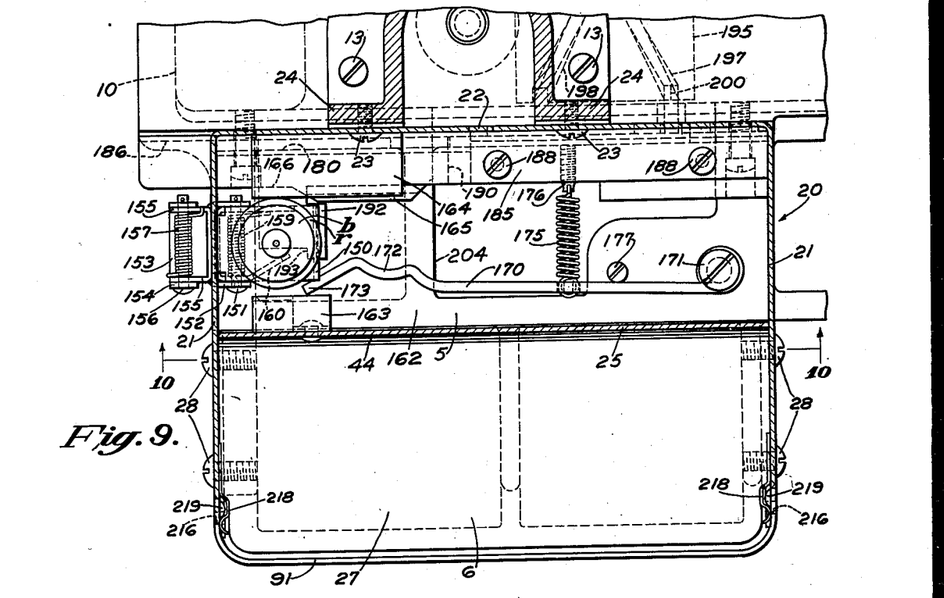
Fig. 9 is an enlarged plan view of the means for catching the bobbin and the clamping means for holding it while it is being stripped with the walls of the casing shown partly in section.

The remainder of the enclosure for the mechanism of the device is preferably constructed of sheet-metal in the form of a rectangular box-like casing 20 having side walls 21 connected by a rear wall 22 which is fastened by screws 23 to vertical ribs 24 projecting from the sides of the semi-circular portion 15 of the housing 3, see Figs. 3, 6 and 9. The casing 20 is divided into two compartments 5 and 6, previously referred to, by means of a vertical partition 25, in the form of a sheet-metal plate suitably secured in place in its interior. The partition 25 is preferably removable, a portion of the plate of approximately one-half its width being bent rearwardly in an extension 26, see Figs. 3 and 5, with its end hooked into a reverse hook 43 at the top of the rear wall 22. The lower edge of the partition-plate 25 is received in a groove 44 at the bottom of the casing 20, see Figs. 1 and 3. The rearward compartment 5 has its side walls and its rearward wall seated on the flat top of the housing 2 while the side walls of the forward compartment project downwardly a slight distance therebelow with their lower ends fastened by screws 28 to the sides of a bracket-like shelf 27 projecting forwardly from the side of the housing 2, see Figs. 1 and 10.

The pocket or receptor 7 for holding the stripped bobbins may be constructed of sheet-metal with a bottom wall 29 curved upwardly at its ends and the outer end wall 30 fastened at 31 to the end wall 11 of the housing 2. The rearward portion of the side wall 32 of the receptor 7 is extended upwardly and fastened to a recess in the side wall 9 of the housing 2 by screws 33, see Fig. 6; while the front wall is cut away at the top as shown by dotted lines in Fig. 6 to provide an opening for viewing the bobbins dropping into the receptor 7 to be lifted out therefrom by the conveyor described later.

Figure 2:
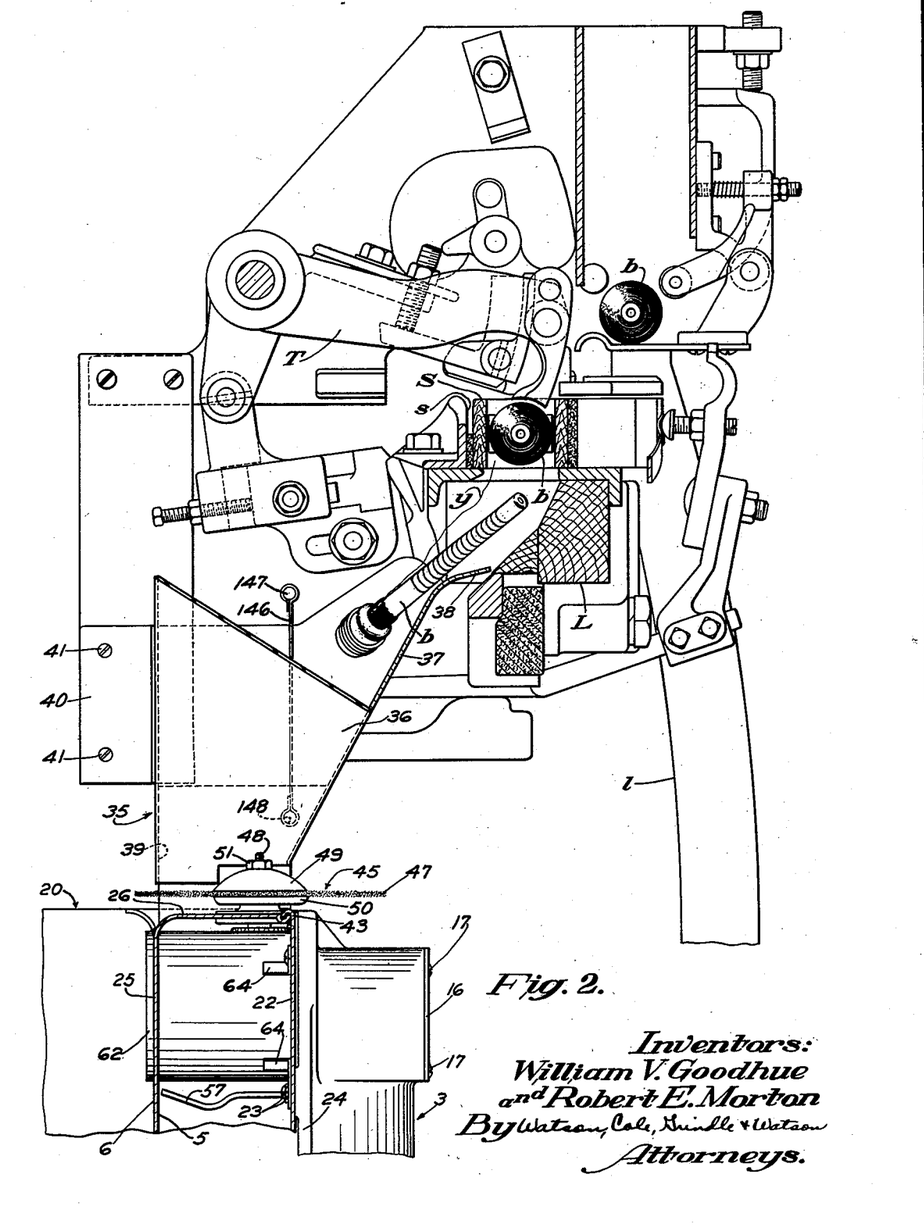
Fig. 2 is an enlarged side elevational view of a portion of a loom with a part of the bobbin-stripper shown in connection with filling-changing mechanism employing a vertical hopper for containing the reserve bobbins.

Referring to Figs. 1 and 2, a chute 35 is provided above the casing 20 for directing the spent bobbins down through the opening in the top of the stripper compartment 5 as they are ejected from the shuttle S. The chute 35 may be constructed of sheet-metal with vertical side walls 36 and an inclined rearward wall 37 terminating in a curved lip 38 which enters the opening in the front of the lay L when the latter moves forwardly to beat up the filling during the weaving process. The front wall 39 of the chute 35 is provided with a flanged extension 40 fastened to the side of the loom by screws 41, see Figs. 1 and 2.

Figure 4:
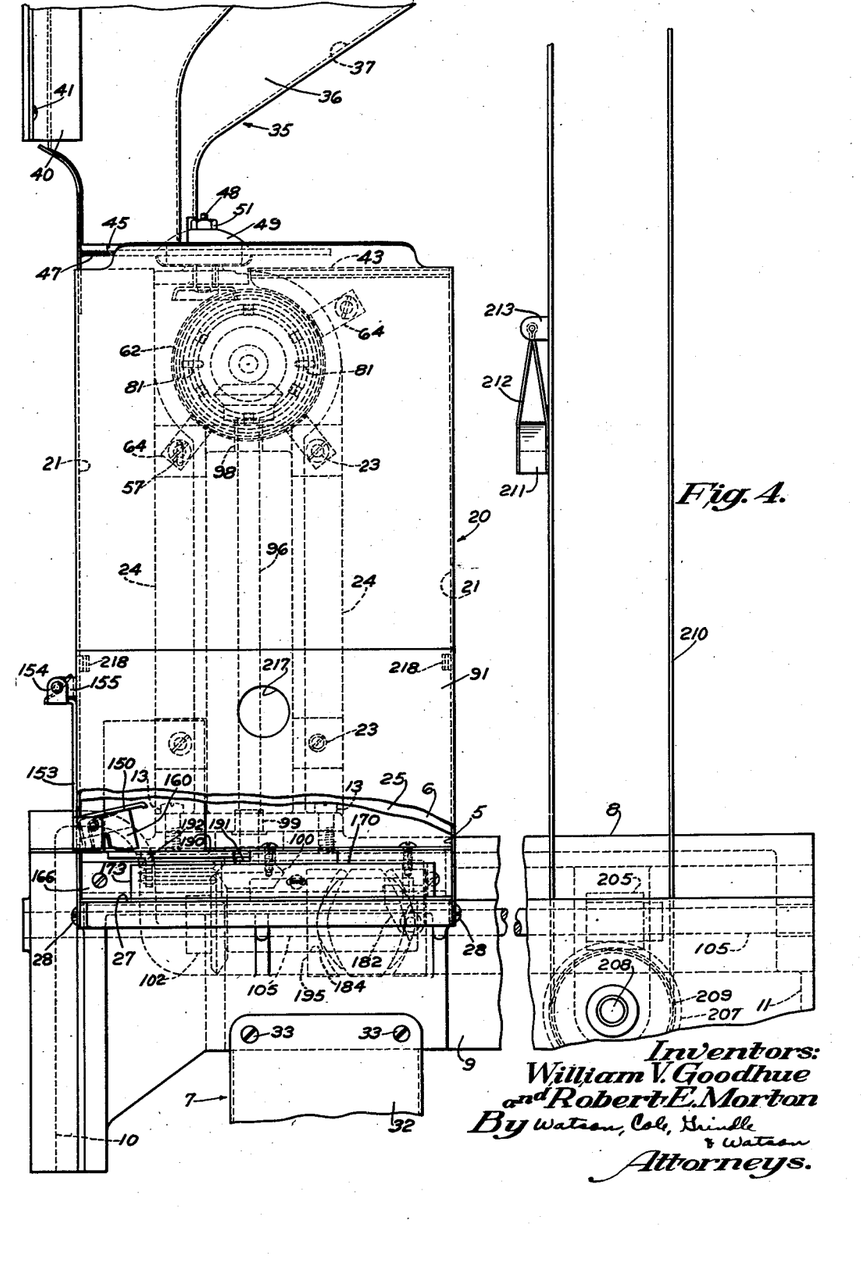
Fig. 4 is a front elevational view of the stripper with the forward walls of the casing shown as partly broken away at the bottom to illustrate the receiving and holding means for the bobbin and the conveyor-belt carrying a magnet or magnets for lifting the bobbins and transporting them therefrom.

Below the chute 35 is a rotary brush 45 arranged with its axis offset at one side thereof as shown in Figs. 4 and 6 so that one section of its radial bristles are disposed to underlie the opening in the bottom of the chute. Referring to Fig. 5, the brush 45 is constructed with a hub 46 in which the bristles 47 are secured with their greater length projecting radially from its periphery. The hub 46 is mounted on a screw-threaded spindle 48 and above and below the hub are concavo-convex disks 49 and 50 clamped in place by a nut 51 on the spindle to cause the edges of the disks to confine the bristles 47 in close association as they radiate from the hub. The spindle 48 projects upwardly from the end of a larger shaft 52 journaled in a bushing 53 held in a bore 54 in a lateral projection 55 on the upper end of the housing 3. The upper shouldered end of the shaft 52 seats in a cupped portion of the lower disk 50 which is held in a recess in the hub 46. Fast on the lower end of the shaft 52 is a beveled worm-gear 60 for rotating the brush 45 by means described later.

A cylindrical guard or shield 62 is mounted at the top of the compartment 5 of the casing 20 with its forward end projecting through a circular opening in the partition wall 25 and its opposite end fastened to the rearward wall 22 of the casing by means of screws 23 inserted through angular tabs 64 welded to the cylinder as shown most clearly in Fig. 4 and at the bottom of Fig. 2. The cylindrical guard or shield 62 surrounds and encloses the tapered mandrel or conical drum 65 on which the yarn is wound to strip it from the bobbin after the latter has dropped down into the compartment 5 of the casing 20. A triangularly-shaped opening 66 extends throughout nearly 180 degrees of the circumference of the shell 62 at one side thereof for the ingress of the end of the yarn therethrough to adapt it to be caught and wound around the drum 65 as it is swept toward the latter by the rotating brush 45; means later described being provided for engaging the yarn to fasten it to the drum. The drum 65 is of hollow construction as shown in Fig. 5 with its hub 67 screwed onto the end of a horizontal shaft 70 journaled in bearings at the upper end of the housing 3. The shaft 70 rotates in bushings 71 and 72 adjacent its ends, the rearward bushing 71 being fitted to the bore of a sleeve 73 held at its forward end in a bore extending through the front wall of the housing 3. The forward bushing 72 is fitted to the bore of a stationary cam-cylinder 75 which is fastened against the face of the front wall of the housing 3 by means of screws 76. The rearward peripheral portion of the mandrel or drum 65 is constructed with an integral projecting annulus or ring 77 which forms the support for a cylindrical shell constituted as a hollow worm 80. The hollow worm 80 is fitted snugly to the periphery of the annulus 77 and held in place by two pins 81, see Fig. 3, projecting radially from opposite sides of the annulus into engagement with L-shaped slots 82 and 83 in the worm-cylinder to fasten the latter in place thereon for rotation with the cone or drum 65.

The worm-cylinder 80 is provided with a helical thread 85 meshing with the teeth on the worm-wheel 60, referred to previously as the means for rotating the shaft 52 which carries the brush 45. The annulus 77 is provided with a plurality of transverse slots 86 forming guideways for a series of bar-like fingers 87 slidable therein and held in place by the worm-cylinder 80 which overlies its periphery. Preferably, six fingers 87 are provided spaced equidistantly around the drum 65 in the slots 86 with their rearward ends formed with slots 88 engaged by a helical projection or thread 90 on the periphery of the cam-cylinder 75. The forward ends of the fingers 87 are undercut at 89 to adapt them to overlie the periphery of the drum 65 in spaced relation thereto for engaging the yarn therebeneath as it is carried through the opening 66 and attaching its end to the drum. The fingers 87 are reciprocated longitudinally of the drum 65 by the helical thread on the stationary cam-cylinder 75 as the drum 65 and its annulus 77 are rotated relatively thereto by the shaft 70. The slots 86 in the annulus 77 are recessed below the periphery of the drum 65 to a slight extent so that the outer ends of the fingers 87 will slide therein with their undercut portions closely overlying the periphery of the drum to engage with the coils of yarn wound therearound. In this way, after a series of coils of yarn have been wound on the cone or drum 65 the yarn will be pushed or swept outwardly towards its smaller end to eventually discharge it therefrom. As the coils are discharged from the end of the drum the yarn will drop down into the waste-compartment 6 of the casing 20 for removal therefrom through a cover or door 91 at the front thereof.

The shaft 70 which rotates the drum 65 and worm 80 is driven by a bevel-gear 93 fastened thereto by a screw 94 with its teeth meshing with those of a similar bevel-gear 95 keyed to a vertical shaft 96 by a screw 97. The shaft 96 is journaled in bushings 98 and 99 held in bores at the top and bottom of the housing 3, see Figs. 3 and 6, and carries a bevel-gear 100 fast on its lower end with its teeth in mesh with those on a larger bevel-gear 102 fast on a horizontal drive-shaft 105 in the lower housing 2.

Figure 7:
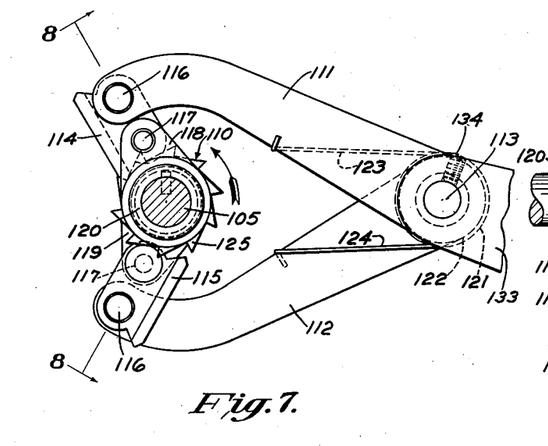
Fig. 7 is an enlarged detailed side view of the reciprocating means for turning the ratchet-disk which rotates the main drive-shaft.
Figure 8:
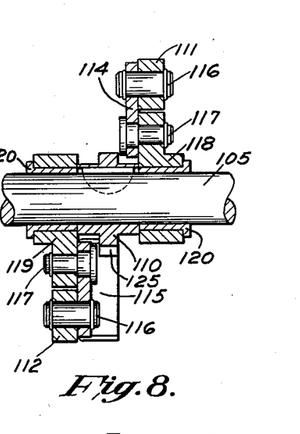
Fig. 8 is a vertical sectional view of the ratchet-means taken on line 8—8 of Fig. 7.

The drive-shaft 105 is journaled in bushings 106 and 107 held in bores in the housing 2 and is connected to be driven from the power-operated mechanism of the loom. For this purpose the drive-shaft 105 carries a ratchet-disk 110, see Figs. 7 and 8, rotated by a pair of reciprocated arms 111 and 112 that are pivoted together by a pin 113. The outer ends of the arms 111 and 112 are pivotally connected to pawls 114 and 115 by studs 116. The pawls 114 and 115 are pivotally mounted on studs 117 carried by a pair of rockable members 118 and 119 rotatable on bushings 120 fast on the shaft 105 at opposite sides of the ratchet-disk 110. A wire-spring 121 coiled around the bearing hubs 122 of the two arms 111 and 112 has its ends extended in straight legs 123 and 124 with their ends hooked respectively around the inner edges of the arms 111 and 112, thereby tending to swing the arms apart about the pivot-stud 113. As the arms 111 and 112 are reciprocated together in opposite directions the pawls 114 and 115 operate alternately to rotate the ratchet-disk 110 and thereby turn the drive-shaft 105 with a substantially continuous motion. For example, when the arms 111 and 112 move to the right, as viewed in Fig. 7, the pawl 115 will be rocked about its pivot 117 to engage its pointed toe with one of the teeth 125 on the ratchet-disk 110 to rotate the latter in contraclockwise direction; while on the other hand, when the arms 111 and 112 are moved to the left the pawl 114 will be rocked on its pivot 117 to engage its toe with one of the teeth 125 of the ratchet-disk 110 to continue its rotation in the same direction.

Referring particularly to Figs. 1 and 3, the arms 111 and 112 are connected for reciprocation to an elbow-shaped lever 130 rockably mounted on a pivot-stud 131 held in a lug at the bottom of the end-wall 10 of the casing 2. The upper angular arm 132 of the lever 130 is bifurcated at its outer end with the sides of the fork 133 straddling the hubs of the arms 111 and 112 and connected thereto by the pivot-pin 113 held by a set-screw 134. A link 135 is pivotally connected to the elbow-portion of the lever 130 by means of a bolt 136 with its opposite end connected to a second lever 137 by a bolt 138, see Fig. 1. The link 135 is preferably adjustable in length, being constructed with two telescopic screw-threaded sections 139 and 140. The lever 137 is secured fast to the rock-shaft 141 that carries the swords l which mount the lay L for reciprocation in the loom, see Fig. 1. The foot of the lever 137 seats on the top of a tubular extension 142 of the shaft 141 with a semicircular strap 143 underlying it. Bolts 144 projecting through the foot of the lever 137 and the ends of the strap 143 with nuts 145 thereon clamp the lever 137 rigidly to the shaft 141. It will be obvious that as the shaft 141 rocks back and forth during the reciprocation of the lay L on the swords l the lever 137 will be oscillated to rock the lever 130 and thereby reciprocate the arms 111 and 112, shown in Fig. 7, to turn the ratchet-wheel 110 and rotate the shaft 105. The shaft 105 besides driving the vertical shaft 96 to turn the upper shaft 70 and rotate the drum 65 and worm 80 is also connected to drive other parts of the mechanism as later described.

Referring to Figs. 1 and 2, it has been stated that the bobbin b carrying the bunch or reserve yarn adjacent its butt end is dropped down through the chute 35 to enter the opening in the top of the compartment 5 in the casing 20. During the descent of the bobbin in the compartment 5 the end of the yarn strand y is held by the brush 45 and swept through the opening 66 in the shield 62, see Fig. 5, to attach it to the rotating mandrel or drum 65. As the bobbin b enters the chute 35 its downward progress therethrough is checked by striking against a baffle in the form of a pendent curtain 146. The curtain 146 may be of heavy duck or any suitable material suspended at the top by a rod 147 and weighted at the bottom by another rod 148 of relatively heavy metal. The butt end of the bobbin b being heaviest tends to carry the bobbin down in substantially vertical relationship and as it strikes against the curtain or baffle 146 its momentum is checked before it passes out of the chute and slides through the bristles of the brush 45 to enter the compartment 5.

Figure 10:
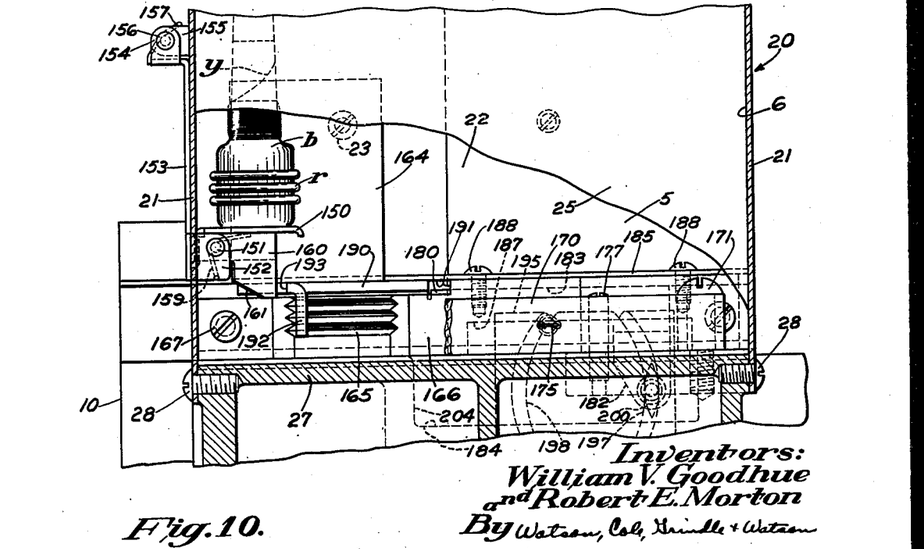
Fig. 10 is an enlarged elevational view of the bottom portion of the casing showing the bobbin-catching means and clamping means illustrated in Fig. 9 with the walls of the casing shown in section and partially broken away.
Figure 11:
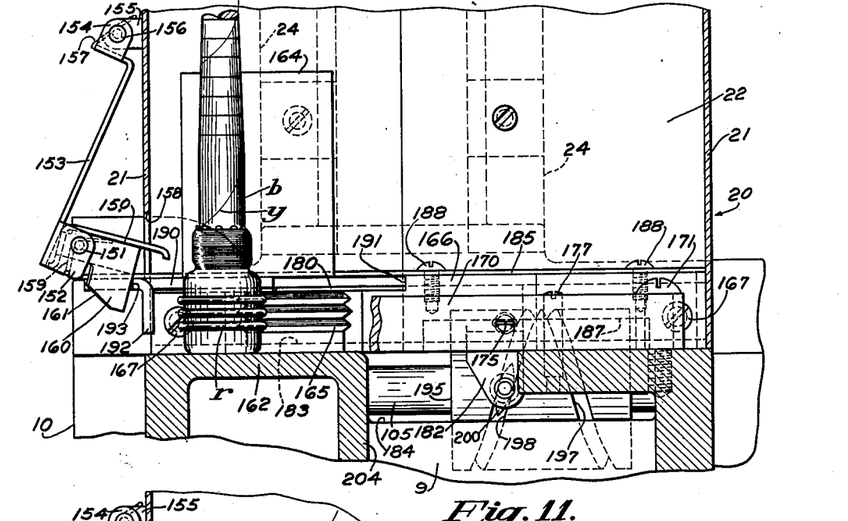
Fig. 11 is an enlarged elevational view of the lower part of the casing similar to Fig. 10 showing the bobbin after it has been released from the latch-plate or step onto which it drops just prior to its being carried into the clamping means.
Figures 12, 13:
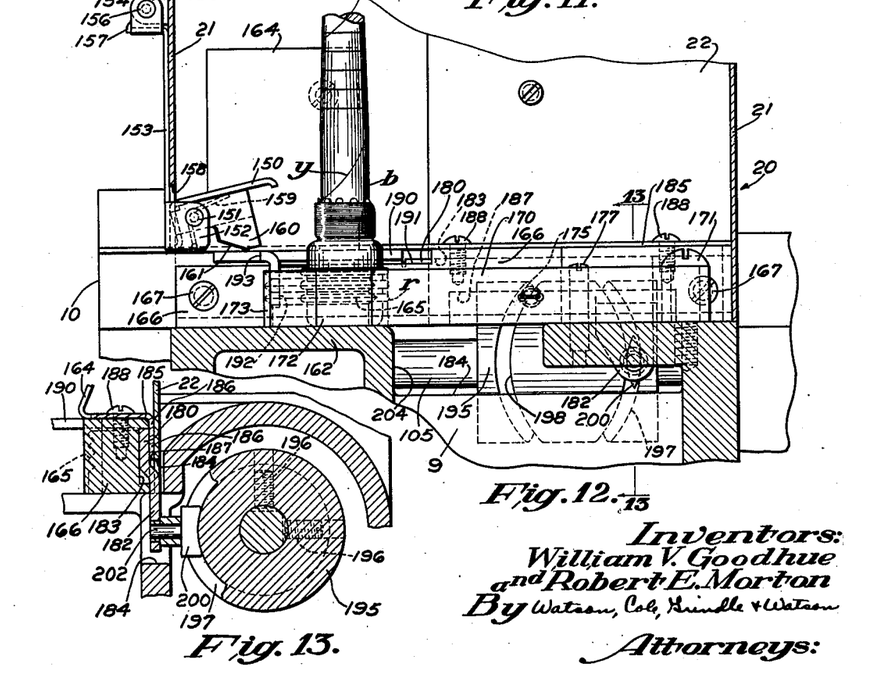
Fig. 12 is a similar elevational view showing the bobbin as engaged by the clamping means and the latch-plate or step returned to initial position.
Fig. 13 is a sectional view on line 13—13 of Fig. 12 showing the cam for reciprocating the ejector slide and its connection thereto.

To check the descent of the bobbin down into the bottom of the stripping compartment 5 and insure that it is properly held therein it is first received on a latch-plate or step 150 shown in detail in Figs. 9, 10, 11 and 12. The latch-plate or step 150 is pivotally mounted on a headed pin 151 extending between the ears 152 of a rockable arm 153 hinged to the side wall 21 of the casing 20. The arm 153 has ears 154 at its upper end straddling lugs 155 on the wall 21 and pivoted thereto by a pin 156. A wire spring 157 coiled around the pin 156, see Fig. 9, has one end bearing against a lug 155 with its opposite end engaging the edge of the bent end of the arm 153 whereby it tends to force the arm against the side of the casing 20 to swing the latch-plate or step 150 through an opening 158 therein and position it within the compartment 5 as shown in Fig. 12. Coiled around the pin 151 is a spring 159 having one end engaged in a notch in one of the ears 152 on the arm 153 with its opposite end bearing against the under side of the latch-plate 150 whereby it tends to swing the latter upwardly as shown in Fig. 12. The rearward depending portion of the latch-plate 150 strikes against the back of the arm 153 to limit the rocking motion of the plate in this direction. A keel-like-projection 160 extends downwardly from the bottom of the plate or step 150 in a plane inclined to its side and has its lower edge beveled or extended in angular relation to the horizontal at 161. The keel-plate 160 is provided for engagement with reciprocable means which acts to swing the latch-plate or step 150 outwardly from the compartment 5 through the opening 158, see Fig. 11, and cause the bobbin b to slide off therefrom in the manner and for the purpose as later more fully explained.

As the bobbin b is released from the latch-plate or step 150 it drops down to seat its butt end against a ledge or rest 162 formed by the flat upper wall of the housing 2, see Figs. 3 and 11. During this latter movement of the bobbin b its butt end is guided by inclined plates 163 and 164 which serve as guards at the sides of the compartment 5, shown by dotted lines in Fig. 3 and full lines in the plan view, Fig. 9. In order to hold the bobbin against upward movement under the force of drawing off the yarn from the bunch it is secured fixedly on the shelf or rest 162 by gripping or clamping means as next described. Located just above the shelf 162 at the rearward side of the compartment 5 are a series of horizontal grooves 165 formed in the projecting portion of a transverse bar 166 which rests on the shelf 162 and the end wall of the housing 2. The bar 166 is of rectangular shape in cross-section and extends the full width of the casing 20 between its side walls 21 with screws 167 fastening it to the upright side wall 69 of the housing 2, see Fig. 3. The grooves 165 are bevel-sided or V-shaped and adapted to receive and engage the surfaces of wire rings r surrounding the butt or head of the bobbin b; such rings being of conventional form for holding bobbins in the jaws of loom-shuttles. A relatively flat clamping arm 170, see Fig. 9, pivoted on a stud 171 screwed into the top wall of the housing 2 has its outer end shaped with a concaved portion 172 terminating in an angular extension 173. A helical spring 175 formed with a loop at one end hooked through a pair of holes in the clamping arm 170 has its opposite end anchored to a stud 176 screwed into the side of the bar 166. The spring 175 tends to swing the arm 170 towards the bar 166 at the rear of the casing 20 with its movement in this direction limited by an upstanding stud 177 against which it strikes, see Figs. 9 and 10. After the bobbin b has dropped onto the ledge or shelf 162, as shown in Fig. 11, it is forced laterally to the right as viewed in Fig. 9 to cause its butt to slide along the angular extension 173 on the arm 170 until its rings r seat in the concavity 172 of the arm. The arm 170 is thus caused to swing outwardly against the tension of the spring 175 and eventually, as the rings r on the butt of the bobbin seat in its arcuate recess or concavity 172 they will engage in the grooves or recesses 165 in the bar 166 to rigidly secure the bobbin b in upright position. It will be understood that this transfer of the bobbin from the latch-plate or step 150 takes place quite rapidly so that the bobbin will be firmly gripped and secured in place at the bottom of the compartment 5 before any considerable tension has been applied to the yarn drawing off from the bunch and being wound on the drum or mandrel 65.

The bobbin b is moved laterally to be clamped between the grooved face of the bar 166 and the clamping arm 170 by means of a reciprocating slide 180 shown in Figs. 9 to 13, inclusive. Referring particularly to Figs. 10 and 13 the slide 180 is preferably constructed in the form of a sheet-metal bar having a depending projection or lug 182, see also Fig. 11, offset laterally from its main portion. The slide 180 is mounted to reciprocate in a longitudinal slot or guideway 183 cut into the rearward side of the bar 166 with its laterally-offset lug 182 projecting therebelow.

Seated against the top and rearward side of the bar 166 is a plate 185 of right-angular cross-section having its rearward vertical portion 186 overlying the slot 183 in engagement with the rearward face of the slide 180, as shown in Fig. 13, to take the lateral thrust thereof. This portion 186 of the plate 185 is cut away at the bottom to form an opening 187 providing clearance for the lug 182 to reciprocate therein. The wall of the casing 20 is also cut away or formed with an opening 184 for this same purpose. The plate 185 is fastened down on the bar 166 by a pair of screws 188 and extends toward the left as viewed in Fig. 12 clear through the opening 158 in the side wall 21 of the casing 20. The end portion of the plate 185 forms the support for the angular guide-plate 164, previously referred to, which is integral therewith and bent upwardly therefrom as shown most clearly in Figs. 3, 11 and 13, with the upper end of the guide-plate bearing against the side of the compartment 5.

Referring to Figs. 10 and 13, the slide 180 is formed with a horizontal overhanging portion 190 projecting forwardly through a slot or recess 191 in the top of the fixed bar 166. This overhanging portion or arm 190 is formed with a downward projection or vertical finger 192 constituted as a pusher for sliding the bobbin toward the clamping means in the bottom of the compartment 5 when the slide 180 moves toward the right, as viewed in Fig. 11. The arm 190 is also adapted to engage the edge of the keel 160 on the latch-plate or step 150 to swing the latter through the opening 158 in the side wall 21 of the casing 20 when the slide moves toward the left, as viewed in Fig. 11, to cause it to release the bobbin b from the step. For this purpose the finger 192 is formed with a shoulder 193 for engaging the vertical edge of the keel 160 on the latch-plate 150 as shown in Fig. 11. On the other hand, the rounded bent portion of the finger 192 is adapted to engage the beveled edge of the keel 160 on the latch-plate 150 when the slide 180 moves in the opposite direction or toward the right, as viewed in Figs. 11 and 12, to lift the latch-plate should it be depressed by a bobbin resting thereon so that the finger 192 may pass by the keel.

The slide 180 is reciprocated by a cylindrical cam 195 fast on and rotated by the drive-shaft 105 previously described, see Fig. 6. The cam 195 is secured rotatively to the shaft 105 by means of set-screws 196 as shown in Fig. 13 and is formed with oppositely-directed crossing helical grooves 197 and 198. A lenticular-shaped shoe 200, see Figs. 12 and 13, is pivotally mounted on the slide 180 by means of its stem 202 journaled in a bushing set into a bore in the lug 182 on the slide 180. The shoe 200 engages with the grooves 197 and 198 of the cam 195 to cause it to reciprocate the slide 180. The back and forth reciprocation of the slide 180 is substantially continuous as the shaft 105 is rotated by the ratchet means previously described. The slide 180 also serves as an ejector for forcing the next bobbin released from the rest 150 against the bobbin in the clamping means to eject the latter therefrom and cause it to drop through an opening 204 in the bottom of the casing 20, see Fig. 9, and be received in the pocket or receptor 7 where it reclines on the bottom thereof as shown in Fig. 6.

The stripped bobbins b' are lifted out of the receptor 7 by conveyor-means next described. Referring to Fig. 6, the drive-shaft 105 has a worm 205 held fast thereon by a set-screw 206 with its teeth meshing with a worm-wheel 207 carried by a shaft 208 which is journaled in bearings at the sides of the housing 2, see Fig. 3. The shaft 208 carries a pulley 209 around which passes a conveyor-belt 210 of any suitable form or construction. As shown in Fig. 6, the two lengths of the conveyor-belt 210 extend upwardly to and pass around idler pulleys (not herein shown) which may be located near the upper part of the loom or at any other desired location adjacent a bobbin winding machine for rewinding the bobbins as they come from the stripper. As herein illustrated the belt 210 has suspended therefrom one or more permanent magnets 211 of horseshoe-shape, as shown by dotted lines at the bottom of Fig. 3. The magnets 211 may be suspended from the belt 210 by means of straps 212 pivoted to ears 213 fastened to the belt 210. As the pulley 209 is rotated with the shaft 208 by means of the worm 205 and worm-wheel 207 the belt 210 will be carried in clockwise direction therearound as viewed in Fig. 6. The magnets 211 will thereby be lowered into the pocket or receptor 7 to pass above the recumbent bobbins b' and drag across the wire rings r' thereon to attach them thereto. Then as the belt travels upwardly the bobbins will be lifted out of the pocket or receptor 7 and remain suspended from the belt as indicated by dotted lines in Fig. 6 to transfer them to a location where they may be delivered to the magazine of a winding machine to supply them with filling yarn for the loom. As before indicated the winding machine may be at the loom or at a location remote therefrom as desired.

The stripped yarn discharged from the mandrel or drum 65 falls into the compartment 6 and the accumulation may be removed therefrom periodically by opening the cover or door 91, previously referred to, see Figs. 1, 3 and 9. The door 91 is hinged at the bottom of the casing 20 on pins 216 to adapt it to swing outwardly at the top, a circular hole 217, see Fig. 4, being provided near its top for the insertion of the finger and also for use as a sight-opening to disclose the amount of waste yarn discharged into the compartment 6. Spring-latches 218 shown in Figs. 4 and 9 are arranged to snap over buttons 219 on the interior of the walls of the casing 20 to latch the door in closed relationship.

The construction and arrangement of the present improved bobbin-stripper having now been described in detail its method of operation is explained as follows: The present bobbin-stripper is adapted particularly for use in cooperation with automatic looms having filling-changing mechanism for replenishing the filling yarn in the shuttle. However, it also may be employed for other applications with the bobbins fed thereto either from a conveyor or manually. Fig. 1 shows the stripper applied to use with a conventional type of loom having a rotary battery B for supplying full bobbins to the shuttle S; and Fig. 2 illustrates it in connection with a different type of loom in which the wound bobbins are supplied from a vertical hopper. Automatic looms employ a feeler-motion for testing the amount of yarn in the operating shuttle and when substantial exhaustion of the service winding on a bobbin is indicated, the filling-changing mechanism operates to transfer a fresh bobbin to the shuttle and simultaneously eject the spent bobbin therefrom. For this type of loom the bobbins are wound with a reserve winding or bunch at the butt end to insure that the yarn will not run out after the service winding is exhausted to cause mispicks in the cloth; that is, to provide sufficient yarn on the bobbin during the last picks of the shuttle to prevent it running out before the bobbin is ejected therefrom.

Referring to Fig. 1, the fresh bobbin is inserted in the shuttle by a transferer T which is rocked downwardly by the operation of the filling-changing mechanism and as the full bobbin is pressed against the spent bobbin it forces it down through the bottom of the shuttle S, whence it drops down through an opening in the lay L. Fig. 2 illustrates a slightly different form of transferer T which operates in the same manner to carry the full bobbin down into the shuttle and eject the spent bobbin therefrom.

The spent bobbin b is received in the upper end of the chute 35 as the lay L reaches its forward position and as the bobbin descends therein its heavier butt end will tend to fall first with the tip end pointing upwardly. During the descent of the bobbin in the chute 35 it strikes against the baffle or pendent curtain 146 to check its fall and retard its motion, whereafter it drops through the opening in the bottom of the chute to be received in the compartment 5 of the stripper. As the bobbin leaves the chute 35 it passes through the bristles 47 of the rotary brush 45 and the trailing length of the yarn y which has been severed from the cloth will be caught in the bristles and rotated by the brush to carry it through the opening 66, see Fig. 5, in the cylindrical shield 62. As the bobbin b drops down through the compartment 5 the trailing yarn y is thus carried across the periphery of the rotating drum or mandrel 65 and caught under the ends of the reciprocating fingers 87 to cause it to wind on the drum. The descending bobbin is initially received on the latch-plate or step 150 adjacent the lower end of the compartment 5, see Figs. 9 and 10, the step being maintained normally in upward inclined relationship, as shown in Fig. 12, by its spring 159 with the weight of the bobbin tending to rock it downwardly into horizontal position. With the latch-plate 150 tilted upward the shoulder 193 at the end of the ejector-slide 180 will clear its keel 160 when the slide moves to the left during intervals when there is no bobbin on the plate. Consequently, the slide is free to reciprocate back and forth without engaging the keel 160 to rock the latch-plate 150 until the bobbin is seated thereon. When a bobbin becomes seated on the latch-plate 150 it acts to rock the plate downwardly after the shoulder 193 on the slide 180 has moved to the right past the keel 160 on the plate. At the next movement of the slide 180 toward the left, as viewed in Figs. 11 and 12, the shoulder 193 on the slide will engage against the vertical edge of the keel 160 and as the slide continues its movement in this direction it will carry the latch-plate or step 150 outwardly through the opening 158 in the side of the casing 20 with its supporting arm 153 swinging on its hinge-pin 156. Under this action the bobbin seated on the plate 150 will be caused to slide off therefrom and drop down into the bottom of the compartment 5 to rest on the ledge 162. Then as the slide 180 moves back to the right again its depending finger 192 will engage with the rings r on the head of the bobbin and slide the latter to the right to enter the rings in the clamping means.

As the bobbin is moved toward the right the rings r will slide along the inclined end 173 of the clamping arm 170, see Fig. 9, to rock the latter forwardly to adapt it to receive the rings in the concaved portion 172 of the arm. As the rings r on the bobbin pass beyond the inclined portion 173 of the arm 170 the tension of the spring 175 will swing the arm toward the rear of the compartment 5 to seat the rings in its concavity 172 and grip them in the tapered grooves 165 of the stationary bar 166, see Figs. 11 and 12. It should be explained that the spring-pressed action of the clamping arm 170 moves the bobbin b toward the right with its rings r engaged in the grooves 165 so that the bobbin will be carried slightly beyond the finger 192 on the slide 180 to prevent its further contact therewith. This provides that there will be clearance between the finger 192 and the rings r on the bobbin b as the slide 180 continues its reciprocation and reaches the right-hand end of its stroke. It further is to be noted that should a bobbin drop onto the latch-plate or step 150 and swing the latter downwardly after the shoulder 193 on the slide 180 has moved to the left-hand end of its stroke, then as the slide moves back in the opposite direction or to the right the rounded upper portion of the finger 192 on the slide will ride along the beveled lower edge of the keel 160 of the latch-plate 150 to lift the latter slightly with the bobbin b remaining thereon. However, as the finger 192 rides out from under the keel 160 on the latch-plate 150 during the movement of the slide 180 toward the right, the latch-plate will be allowed to drop again to return the bobbin into normal position, as shown in Fig. 10. It will now be understood that the latch-plate mechanism is in the nature of a safety device to insure that each bobbin falling into the stripping compartment 5 will be in its proper relation to the clamping means before it is shifted laterally to engage it therewith. For example, if the bobbin were to fall directly into the bottom of the compartment 5 it might strike the ejector-slide 180 as the latter moves toward the left and consequently during the next reciprocation of the slide to the right, as viewed in Figs. 9 and 10, the holding rings r would not be properly engaged with the grooves 165 to secure the bobbin in correct position for stripping. As herein arranged the latch-plate or step 150 catches the bobbin as it falls into the compartment 5 and holds it until the slide 180 has moved toward the right so that at the next opposite movement of the slide it will swing the latch-plate to release the bobbin and cause it to fall into position to be engaged by the pusher-finger 192 when the motion of the slide is reversed with the finger moving to the right. In this way, accurate and positive application of the bobbin to the clamping means is assured to hold it in proper position for stripping.

The stripping operation is effected by winding the yarn y onto the drum or mandrel 65, see Figs. 3 and 5, after the trailing end has been caught under one or more of the reciprocating fingers 87. As the drum 65 is rotated by the shaft 70, which is driven by the gears 93 and 95, the fingers 87 are carried around therewith with the slots 88 at their rearward ends in engagement with the helical teeth 90 on the stationary cam-cylinder 75. Through this connection the fingers 87 are continuously reciprocated to slide them in the slots 86 in the annulus 77 and advance them in sequence toward the outer smaller end of the drum 65. Consequently, as the winding yarn accumulates on the drum or mandrel 65 while drawing upwardly from the clamped bobbin b, the fingers 87 push the coils off from the end of the drum to discharge the yarn into the compartment 6; it having been previously stated that the waste yarn accumulating in this compartment may be removed through the door 91.

A guide-rod 57 formed with an arcuate bend toward its outer extremity is fastened to the wall of the casing 3 by one of the screws 23, previously referred to, see Fig. 5. The rod 57 acts as a guard for engaging the barrel of the bobbin b as it drops down into the compartment 5, thereby tending to straighten the bobbin into upright position should it have a tendency to cant or incline at a sharp angle to the vertical, see also Fig. 4.

It has been explained that the shaft 70 and rotating drum 65 are driven from the vertical shaft 96 by the gears 93 and 95 and also that the shaft 96 is driven from the horizontal shaft 105 in the lower housing 2. The shaft 105 is driven through the ratchet-mechanism, previously described and shown in Figs. 7 and 8, by the oscillation of the lever 130 connected to the arms 111 and 112 which carry the pawls 114 and 115 for turning the ratchet-disk 110. The lever 130 is connected by the link 135 to the lever 137 fast on the shaft 141 which oscillates with the reciprocation of the lay L of the loom; it being understood that in other applications of the stripper the drive-shaft 105 may be driven from a motor or other source of power.

The slide 180 is reciprocated continuously by the cam 195 on the shaft 105 and its motion is so timed that it acts as an ejector to release the bobbins from the clamping means and push them into position to drop down into the pocket or receptor 7. The ejection of each stripped bobbin takes place only after another bobbin has been released from the latch-plate 150 to be engaged with the clamping means. As the newly-received bobbin drops down onto the shelf or rest 162 at the side of the stripped bobbin the ejector-slide 180 starts to move toward the right, thereby causing its finger 192 to engage the side of the newly-received bobbin and push it against the bobbin that remains in the clamping means. The continued movement of the slide 180 toward the right will therefore slide the newly-received bobbin into the clamping means while pushing the previously-stripped bobbin out therefrom to cause it to drop into the pocket or receptor 7.

Referring now to Fig. 6, the stripped bobbin b' slides down into the bottom of the pocket or receptor 7 where one of the magnets 211 carried by the conveyor-belt 210 will draw across its holding rings r to attach itself thereto and as the belt travels upwardly the bobbin will be suspended and carried along therewith as indicated by the dotted lines in Fig. 6. It will be understood that the arrangement of the magnets may be modified to attach the stripped bobbins to the conveyor-belt 210 in other positions and transport them in different directions from that shown in Fig. 6 in accordance with the purpose of the transfer. In the present instance, the vertically-traveling conveyor-belt 110 is employed for conveying the bobbins to a location above or alongside the loom to deliver them to a suitable magazine for supplying the winding machine which winds the yarn thereon.

It will be observed from the foregoing specification that the present invention provides a novel and ingenious bobbin-stripper adapted for use in cooperation with automatic looms or for operating independently thereof on partly-denuded bobbins to remove the residual yarn therefrom.

While the device is herein described and illustrated in its preferred form, it will be understood that modifications may be made in the structure and arrangement of its parts without departing from the spirit or scope of the invention as expressed in the following claims. Therefore, without limiting ourselves in this respect, we claim:

1. For use with a loom having filling-changing mechanism for supplying wound bobbins to the shuttle and ejecting spent bobbins therefrom, a bobbin-stripper having means for receiving a spent bobbin, means engageable with the bobbin to fixedly hold it for drawing off the yarn remaining on said bobbin, and means for ejecting the denuded bobbin from the stripper for transfer to another location.

2. For use with a loom having filling-changing mechanism for supplying reserve bobbins to the shuttle and ejecting spent bobbins therefrom, a bobbin-stripper having means for receiving the spent bobbin ejected from the shuttle, clamping means for rigidly holding the bobbin in fixed position in the stripper, and means for withdrawing the residual yarn from the bunch on the bobbin.

3. For use with a loom having filling-changing mechanism for supplying reserve bobbins to the shuttle and ejecting spent bobbins therefrom, a casing for receiving the spent bobbins ejected from the shuttle, means for holding each bobbin in fixed position in the casing, means for withdrawing the yarn remaining in the bunch on the bobbin, conveyor-means for conveying bobbins from the stripper, and means for delivering the stripped bobbins to the conveyor.

4. For use with a loom having filling-changing mechanism for replenishing the filling in the shuttle and ejecting spent bobbins therefrom, a bobbin-stripper for receiving the ejected bobbins, clamping means for holding the bobbins in fixed position, means for winding on yarn to withdraw it from a bobbin, means for discharging the waste yarn from the winding on means, and means for removing the stripped bobbin from the holding means and replacing it with another bobbin containing yarn.

5. For use with a loom having filling-changing mechanism for supplying wound bobbins to the shuttle and ejecting spent bobbins therefrom, a bobbin-stripper having means for clamping and holding a bobbin, a rotary mandrel for winding on the yarn to withdraw it from the bobbin, and means for catching and holding the yarn trailing from each bobbin and fastening its end to the mandrel to wind it thereon.

6. For use with a loom having filling-changing mechanism for supplying wound bobbins to the shuttle and ejecting spent bobbins therefrom, a bobbin-stripper located adjacent the loom for receiving the spent bobbins therefrom, means for holding the bobbins in fixed position in the stripper, means for retaining the length of yarn trailing from a bobbin as it enters the stripper, a rotary mandrel, and means for attaching the trailing length of yarn to the mandrel to cause it to wind thereon to withdraw it from the bobbin.

7. For use with a loom having filling-changing mechanism for supplying reserve bobbins to the shuttle and ejecting spent bobbins therefrom, a bobbin-stripper for receiving the spent bobbins, a rotary mandrel for winding on the yarn to withdraw it from the spent bobbin, means for retaining the length of yarn trailing from a bobbin as it is received in the stripper and attaching it to the mandrel, means for delivering the stripped bobbins from the stripper, and a conveyor having magnetic means for attaching the stripped bobbins to transport them from the stripper.

8. A bobbin-stripper for removing the residue of yarn from spent bobbins including means for receiving and holding the bobbins, rotary means for winding on the yarn to withdraw it from the bobbins, means for catching the length of yarn trailing from a bobbin and attaching it to the winding means, and means for ejecting the stripped bobbins from the holding means.

9. A bobbin-stripper for removing the yarn remaining on spent bobbins comprising means for receiving and holding the bobbins, a rotary mandrel for winding on the yarn to withdraw it from the bobbins, means for retaining the length of yarn trailing from each bobbin and attaching it to the mandrel, and means for progressively discharging the yarn from the mandrel as it accumulates thereon.

10. A bobbin-stripper comprising a casing for receiving spent bobbins having a residue of yarn remaining thereon, means for holding a bobbin in fixed position within the casing, a rotary mandrel for winding on the yarn to withdraw it from the held bobbin, means for attaching the length of yarn trailing from the bobbin to the winding-on mandrel, means for discharging the wound yarn from the mandrel as it accumulates thereon during the stripping operation, and a compartment in the casing for receiving the yarn discharged from the mandrel.

11. A bobbin-stripper for removing the residue of yarn remaining on spent bobbins comprising means for receiving and holding the bobbins, a rotary mandrel for winding on the yarn to withdraw it from the bobbins, means for retaining the end of the yarn trailing from a bobbin as it enters the stripper, means for attaching said trailing end to the mandrel, and means reciprocating longitudinally of the mandrel to engage the yarn accumulating on the mandrel and discharge it from the end thereof.

12. In a bobbin-stripper the combination of means for receiving and holding a spent bobbin containing residual yarn remaining thereon, a rotary mandrel having a conical periphery, means for rotating said mandrel, means for attaching the length of yarn trailing from the bobbin to the mandrel to wind it thereon and withdraw it from the bobbin, a plurality of fingers spaced circumferentially of the mandrel and slidable longitudinally thereof, and means to reciprocate said fingers during rotation of the mandrel to cause them to push the accumulation of yarn off from the end of the mandrel.

13. In a bobbin-stripper, the combination of a rotary mandrel for winding on yarn to withdraw it from a bobbin held in the stripper, a rotary brush for catching the length of yarn trailing from the bobbin as it enters the stripper, means for attaching the end of the yarn held in the brush to the winding mandrel, and means for progressively discharging the wound yarn from the mandrel to prevent an excessive accumulation thereon.

14. A bobbin-stripper comprising a rotary mandrel for winding on yarn to remove it from the bobbins, means for rotating said mandrel, a plurality of reciprocating elements slidable longitudinally of the mandrel, a cam for reciprocating said elements to adapt them to engage the wound yarn and push it off from the end of the mandrel as it accumulates thereon, and means for attaching the yarn trailing from a bobbin to the mandrel to cause it to wind thereon to strip it from the bobbin.

15. In a bobbin-stripper for receiving spent bobbins and removing the residue of yarn therefrom, a rotary mandrel for winding on the yarn to withdraw it from the bobbin, clamping means for holding the bobbin in the stripper, means for attaching the length of yarn trailing from the bobbin to the mandrel to cause it to wind thereon, means for initially supporting a bobbin adjacent the clamping means, and means operative to release said bobbin from the supporting means and thereafter engage it with the clamping means.

16. In a bobbin-stripper for receiving spent bobbins and removing the residue of yarn therefrom, a rotary mandrel for winding on the yarn to withdraw it from the bobbin, means for holding the bobbin in the stripper, means for attaching the end of the yarn trailing from the bobbin to the rotary mandrel, means for initially supporting the bobbin adjacent the holding means, and reciprocating means operative when moving in one direction to release the bobbin from the supporting means and when moving in the opposite direction to engage the bobbin with the holding means, said reciprocating means acting to engage the next bobbin released from the supporting means and move it against the bobbin in the holding means to release the latter therefrom after the stripping operation.

17. In a bobbin-stripper for receiving spent bobbins and removing the residue of yarn therefrom, a rotary mandrel for winding on the yarn to withdraw it from the bobbin, clamping means for holding a bobbin in the stripper, a tiltable rest for supporting a bobbin adjacent the clamping means, a slide reciprocable to engage the rest and tilt it to release the bobbin therefrom, and means on said slide for engaging the released bobbin and moving it into the clamping means, said means engageable with the next bobbin released from the rest to carry it against the bobbin in the clamping means to disengage the latter therefrom and insert the next bobbin in the clamping means.

18. A bobbin-stripper comprising rotary means for winding on yarn to remove the residue from spent bobbins, means for retaining the length of yarn trailing from a bobbin and attaching it to the rotary means to cause it to wind thereon, clamping means for holding the bobbin in fixed position for delivering the yarn therefrom, and reciprocating means for engaging the butt of the bobbin with the clamping means, said reciprocating means engageable with the next bobbin entering the stripper to carry it against the bobbin in the clamping means and force the latter out therefrom and insert the last-received bobbin into the clamping means.

19. For use with a loom, a bobbin-stripper comprising a rotary mandrel for winding on yarn to withdraw the residue remaining on the bobbin, clamping means for retaining the bobbins in position for stripping the yarn therefrom, a reciprocating member for engaging the bobbins with the clamping means, and means driven from the loom for actuating said reciprocating member and rotating said mandrel.

20. For use with an automatic loom having filling-changing mechanism for transferring full bobbins to the shuttle and ejecting spent bobbins therefrom, a bobbin-stripper having a compartment for receiving the spent bobbins, a chute below the loom-shuttle for receiving the spent bobbins therefrom, a rotary brush between the chute and the compartment in the stripper, a rotary mandrel within the stripper below the brush, means for holding a bobbin beneath the rotary mandrel, said brush acting to retain the yarn trailing from the bobbin as it enters the stripper, and means for attaching the trailing length of yarn to the mandrel to wind it thereon.

21. For use with an automatic loom having filling-changing mechanism for transferring full bobbins to the shuttle and ejecting spent bobbins therefrom, a bobbin-stripper adapted to be attached to the side of the loom, a chute for catching the spent bobbins ejected from the shuttle and feeding them to the stripper, a rotary brush for retaining the length of yarn trailing from the bobbins, a rotary mandrel in the stripper, and means for attaching the length of yarn held by the brush to the mandrel to wind it thereon.

22. A bobbin-stripper for receiving spent bobbins and unwinding the residue of yarn therefrom comprising means for holding the length of yarn trailing from the bobbin, a conical drum for winding on the yarn to remove it from the bobbin, a plurality of bar-like fingers reciprocable longitudinally of the mandrel to engage the coils of yarn wound thereon and discharge them from the end of the mandrel, a non-rotatable cam having means engageable with the fingers to reciprocate them, and means for holding the bobbin in the stripper while the yarn is being unwound therefrom.

23. A bobbin-stripper comprising a casing divided into compartments, means for receiving and holding a bobbin in one of the compartments, a rotary mandrel for winding on the yarn to unwind it from the bobbin, said mandrel having its end overlying one of the compartments of the casing, and means slidable on the mandrel to push the yarn off therefrom to discharge it into another compartment of the casing.

24. In a bobbin-stripper for removing the yarn remaining on spent bobbins, a casing for receiving the bobbins, means for winding on the yarn to withdraw it from a bobbin held in the casing, means to eject the stripped bobbins from the casing, a pocket below the casing for receiving the stripped bobbins, a conveyor-belt traveling through the pocket, and permanent magnets carried by the conveyor-belt for attaching the spent bobbins thereto to transport them from the stripper.

25. In a bobbin-stripper for removing the residual yarn from spent bobbins, means for winding on the yarn to remove it from the bobbin, means engageable with the bobbins for fixedly holding them in the stripper, a reciprocating member for releasing a held bobbin from the holding means after the stripping operation, and a cam for reciprocating said member.

26. In a bobbin-stripper for removing residual yarn from spent bobbins, a rotary mandrel for winding on the yarn to strip it from a bobbin held in the stripper, a brush rotatable on an axis at right-angles to the axis of the mandrel and provided with radial bristles for catching and holding the length of yarn trailing from a bobbin delivered to the stripper, means for rotating the mandrel, and means for driving the brush during the rotation of the mandrel.

27. In a bobbin-stripper for removing residual yarn from spent bobbins, means for holding a bobbin in the stripper, means for winding on the yarn to withdraw it from the bobbin, a drive-shaft for rotating said winding means, ratchet-means for rotating the drive-shaft, and a rockable lever adapted to be connected to an oscillating part of a loom to actuate the ratchet-means and drive the winding means.

28. In a bobbin-stripper for removing residual yarn from spent bobbins, means for holding the bobbins in the stripper, rotary means for winding on the yarn to withdraw it from a held bobbin, a casing for receiving bobbins delivered thereinto, an arm pivoted to the side of the casing, a rest pivoted to said arm and adapted to receive a bobbin thereon, clamping means for the bobbins adjacent said rest, and means reciprocable in the casing for engaging the rest to swing the arm and release a bobbin from the rest, said reciprocating means being engageable with a bobbin released from the rest to force it into the clamping means.

29. In a bobbin-stripper for removing residual yarn from spent bobbins, a casing for receiving the bobbins, fixed clamping means having grooves for receiving the rings on the butt of the bobbin to hold it in the casing, a spring-actuated clamping arm for clamping the butt of the bobbin with its rings engaged in the grooves of the fixed clamping means, and means for moving a bobbin into place between the clamping arm and the fixed clamping means.

30. In combination with a bobbin-stripper for removing the residual yarn from spent bobbins, a receptacle for receiving stripped bobbins, a conveyor travelable adjacent the bobbins in the receptacle, and magnetic means pivotally suspended on the conveyor to depend therefrom for engaging metal parts of the bobbins in the receptacle to attach them to said conveyor.

31. In combination, a receptacle for containing empty bobbins having metal clamping rings, a conveyor travelable above the bobbins in the receptacle, and a permanent magnet pivotally attached to said conveyor to adapt it to swing down into the receptacle and attract the metal rings on the bobbins to attach the bobbins in suspended relationship on the conveyor.

32. In combination, a receptacle for containing bobbins having metal portions, a conveyor travelable above the receptacle in spaced relation to the bobbins, and magnets loosely suspended from the conveyor to adapt them to swing down into the receptacle and wipe across the bobbins to attract the metal portions thereof and attach the bobbins in suspended relationship on the conveyor.

WILLIAM V. GOODHUE.
ROBERT E. MORTON.

References Cited in the file of this patent

UNITED STATES PATENTS

| Number | Name | Date |
|---|---|---|
| 1,322,812 | Morrill | Nov. 23, 1919 |
| 1,496,098 | Newell | June 3, 1924 |
| 1,657,426 | Willard | Jan. 24, 1928 |
| 1,739,775 | Baker | Dec. 17, 1929 |
| 1,773,646 | Skor | Aug. 19, 1930 |
| 2,149,778 | Kimbirl | Mar. 7, 1939 |
| 2,192,997 | Geier | Mar. 12, 1940 |
| 2,234,300 | Clough | Mar. 11, 1941 |
| 2,303,048 | Hudson | Nov. 24, 1942 |
| 2,342,909 | Terrell | Feb. 29, 1944 |
| 2,526,253 | Merrill | Oct. 17, 1950 |